US006498299B2

(12) United States Patent
Sekizuka

(10) Patent No.: US 6,498,299 B2
(45) Date of Patent: Dec. 24, 2002

(54) CONNECTION STRUCTURE OF COAXIAL CABLE TO ELECTRIC CIRCUIT SUBSTRATE

(75) Inventor: Takashi Sekizuka, Toyko (JP)

(73) Assignee: Advantest Corporation, Tokyo (JP)

( * ) Notice: Subject to any disclaimer, the term of this patent is extended or adjusted under 35 U.S.C. 154(b) by 0 days.

(21) Appl. No.: 09/879,128

(22) Filed: Jun. 13, 2001

(65) Prior Publication Data

US 2001/0050177 A1 Dec. 13, 2001

(30) Foreign Application Priority Data

Jun. 13, 2000 (JP) ....................................... 2000-176881

(51) Int. Cl.[7] ................................................ H02G 15/02

(52) U.S. Cl. ......................... 174/75 C; 174/78; 439/581

(58) Field of Search ................................ 174/78, 75 C, 174/260, 261; 439/63, 581, 587

(56) References Cited

U.S. PATENT DOCUMENTS 3,939,444 A * 2/1976 Hollyday et al. ............. 174/51
5,145,382 A * 9/1992 Dickirson ................... 439/581

* cited by examiner

*Primary Examiner*—Chau N. Nguyen
(74) *Attorney, Agent, or Firm*—Birch, Stewart, Kolasch & Birch, LLP

(57) ABSTRACT

A connection structure of a coaxial cable to an electric circuit substrate, having a cable block connected to a ground line of the electric circuit substrate and a coaxial cable whose shield is connected to the cable block.

12 Claims, 5 Drawing Sheets

CONNECTION STRUCTURE OF COAXIAL CABLE TO ELECTRIC CIRCUIT SUBSTRATE

BACKGROUND OF THE INVENTION

1. Field of the Invention

The present invention relates to a structure of connecting a coaxial cable to an electric circuit substrate and a structure of connecting a coaxial cable to an electric circuit substrate preferably applied to an electric device testing apparatus for testing a semiconductor integrated circuit element and other variety of electric devices (hereinafter, also simply referred to as an IC).

2. Description of the Related Art

An electronic devices testing apparatus called a “handler” conveys a large number of ICs held on a tray to inside of a testing apparatus where the ICs are pressed against socket terminals connected to a test head, then the IC testing unit (tester) is made to perform a test. When the test is ended, the ICs are conveyed out from the test procedure and reloaded on trays in accordance with results of the tests so as to classify them into categories of good ICs and defective ones.

Here, a socket board 505 (an electric circuit substrate) of the test heads is connected to a coaxial cable 506 shown in FIG. 5. In the related art, a coaxial cable was connected to a socket board by soldering a core wire 506*a* of the coaxial cable 506 to the socket board 505 and a jumper cable J soldered to the socket board 505 and a shield 506*b* of the coaxial cable 506 were twisted together and soldered. By connecting a large number of such coaxial cables 506 to the socket board 505, sending and receiving of test signals is performed between the tester and the test head at the time of pressing ICs against socket terminals.

In the above connection structure of a coaxial cable to a socket board in the related art, however, since the core wire 506*a* constituting a signal line and the jumper cable J constituting an earth line were connected one to one, a space S between the core wire 506*a* and the jumper cable J needs to be at least 2 to 3 mm, so there was a disadvantage that a packaging density of the coaxial cable 506 could not be made higher.

Also, since an earth line was configured by connecting the jumper cable J and the shield 506*b*, the earth line inevitably became long, consequently, there was a disadvantage that inductance of a high frequency range increased and frequency characteristics declined.

Furthermore, there was a disadvantage that consistency of impedance of a signal was poor since exposing portions of an insulation body 506*c* of the core wire was large and not covered by the shield 506*b*.

SUMMARY OF THE INVENTION

An object of the present invention is to provide a connection structure of a coaxial cable to an electric circuit substrate which can heighten a packaging density of coaxial cables and has excellent electric characteristics.

According to the present invention, there is provided a connection structure of a coaxial cable to an electric circuit substrate, comprising a cable block connected to a ground line of the electric circuit substrate and a coaxial cable wherein the ground line is connected to said cable block.

In this connection structure, since a ground line of a coaxial cable is connected to a ground line of an electric circuit substrate via a cable block connected to the ground line of the electric circuit substrate, a plurality of coaxial cables can be grounded by one cable block. Accordingly, an area occupied by the ground line of the electric circuit substrate becomes smaller and a higher packaging density of coaxial cables becomes attainable. Also, since the ground line of the coaxial cable is directly connected to the cable block, the length of the ground line becomes shorter and frequency characteristics improves. Furthermore, by directly connecting the ground line of the coaxial cable to the cable block, the core wire is covered by the ground line to the end of the coaxial cable, as a result, consistency of impedance of signals becomes preferable.

It is not particularly limited in the above invention, but the cable block preferably has a concave portion in accordance with an outward form of the coaxial cable, and the ground line of the coaxial cable is connected to the concave portion.

By setting an outward form of the coaxial cable in a concave portion of the cable block at the time of connecting the ground line of the coaxial cable to the cable block, a position of the core wire of the coaxial cable can be made accurate.

Also, it is not particularly limited in the above invention, but the core wire of the above coaxial cable is preferably connected to a land of a signal line of the above electric circuit substrate.

By connecting the core wire of the coaxial cable to the land of the signal line, connection bias becomes small and a capacity can be made small.

Particularly, as explained above, since the position of the core wire of the coaxial cable is accurately determined by setting the ground line of the coaxial cable in the concave portion in the cable block, relative position with respect to the land of the signal line can be also made accurate.

Also, it is not particularly limited in the above invention, but preferably, the above cable block is formed a conductive material layer, for example, a copper plating layer on a surface of the substrate.

By making a plating layer by a conductive material having a large heat capacity, a temperature rising speed at the time of soldering.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

These and other objects and features of the present invention will be explained in more detail below with reference to the attached drawings, which are given by way of illustration only, and thus are not limitative of the present invention, and wherein.

DESCRIPTION OF THE PREFERRED EMBODIMENTS

Figure 1:
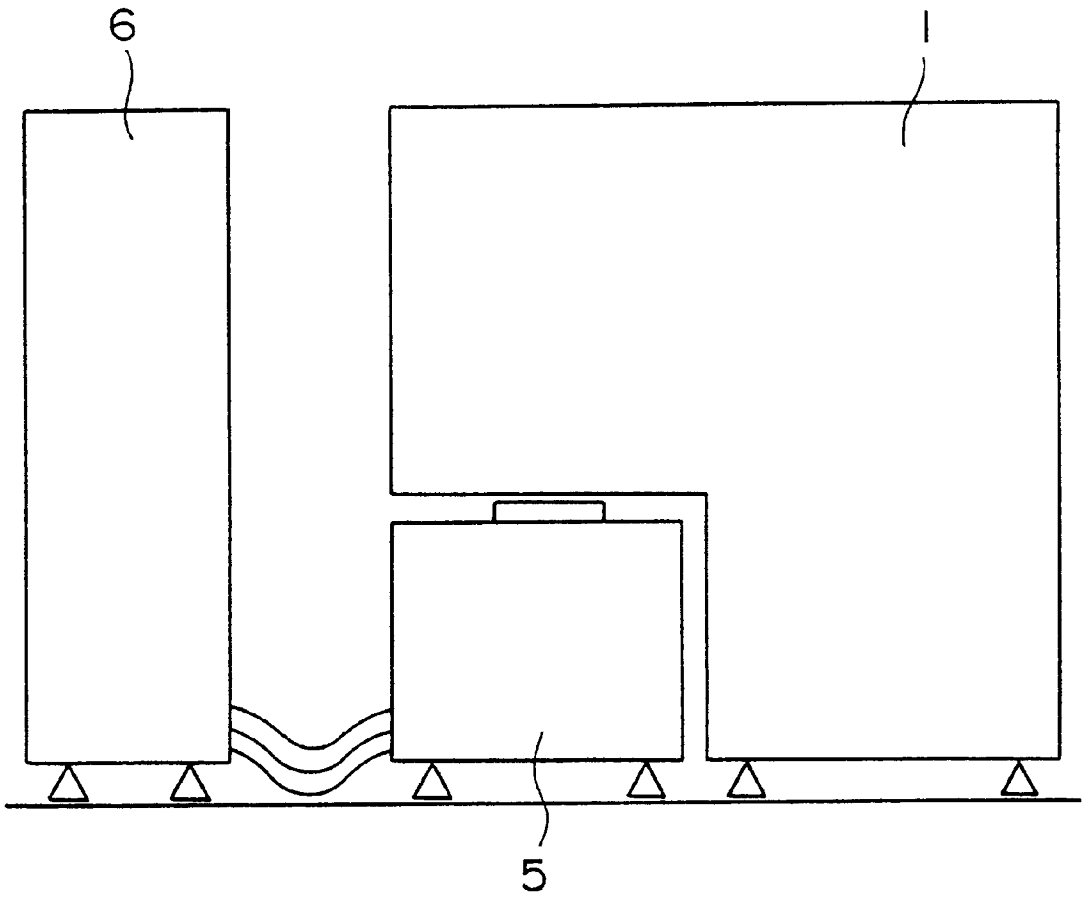
FIG. 1 is a view from a side of an electric device testing apparatus being applied a connection structure of the present invention.

As shown in FIG. 1, an electric device testing apparatus being applied the present invention is comprised of, for example, a handler 1 for handling ICs to be tested, a test head 5 which electrically contacts the ICs to be tested, and a tester 6 for sending a test signal to the test head 5 and conducting a test on the ICs to be tested. The electric device testing apparatus tests (inspects) whether or not ICs suitably operate in a state when high temperature or low temperature stress is applied on the ICs and sorts the ICs in accordance with the test results.

Figure 2:
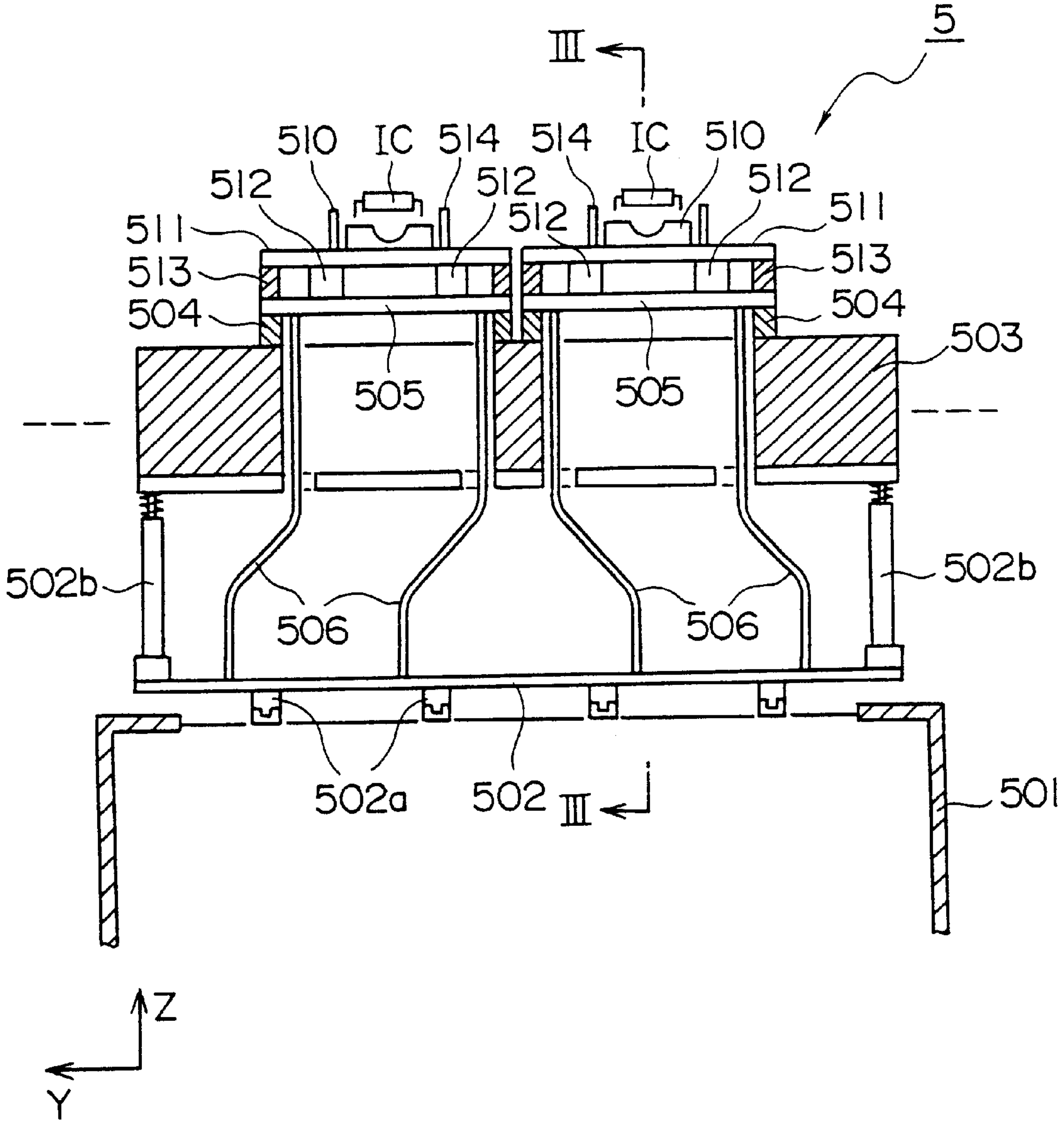
FIG. 2 is a detailed sectional view of a test head in FIG. 1.
Figure 3:
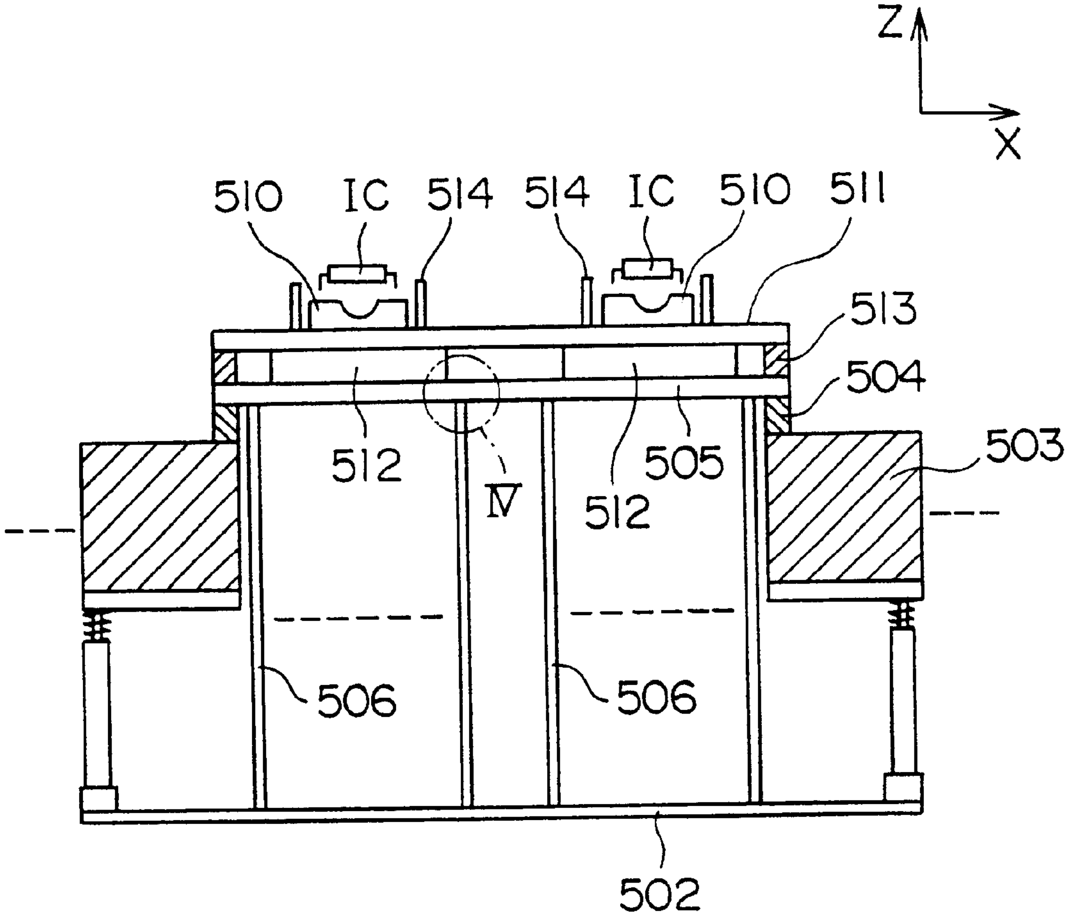
FIG. 3 is a sectional view along the line III—III in FIG. 2.

As shown in FIG. 2 and FIG. 3, in the test head 5, a base board 502 is mounted on the test head body 501 via a connector 502*a* and a spacing frame 503 is provided on the base board 502 via a space column 502*b* capable of slightly moving up and down in a Z-axis direction.

On the spacing frame 503 is provided a socket board 505 via a socket board spacer 504, and further thereon is provided a sub-socket board 511 via a sub-socket board spacer 513.

Between the base board 502 and the socket board 505 is connected by a plurality of coaxial cables 506 and between the socket board 505 and the sub-socket board 511 is connected by a relay terminal 512.

Note that FIG. 2 is a sectional view of seeing the test head 5 to an X-axis direction, wherein only two sets of socket boards 505 and sub-socket boards 511 are shown in a Y-axis direction, however, an actual test head 5 of 4 lines and 16 rows is provided with four sets of socket boards 505 and sub-socket boards 511 in the Y-axis direction.

Also, FIG. 3 is a sectional view of seeing the test head 5 to the Y-axis direction, wherein only one set of socket board 505 and sub-socket board 511 are shown in the X-axis direction, however, an actual test head 5 of 4 lines and 16 rows is provided with eight sets of socket boards 505 and sub-socket boards 511 in the X-axis direction.

An IC socket terminal 510 and a socket guide 514 in accordance with need are provided on the respective sub-socket boards 511. The IC socket terminal 510 comprises a plurality of contact pins for contacting input/output terminals of the ICs to be tested and connected to lands, etc. formed on an upper surface of the sub-socket board 511. Also, the socket guide 514 is a guide for determining positions of the ICs to be tested at the time of bringing the ICs to be tested contact the contact pins of the IC socket terminal 510 and may be omitted.

Figure 4A:
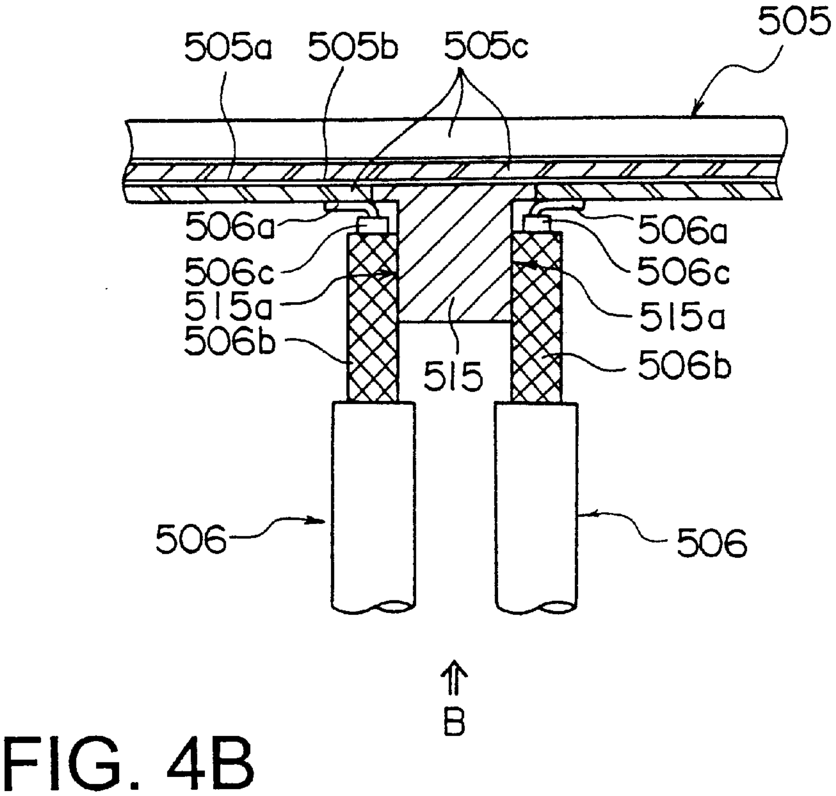
FIG. 4A is a sectional view of an embodiment of the connection structure of the present invention.
Figure 4B:
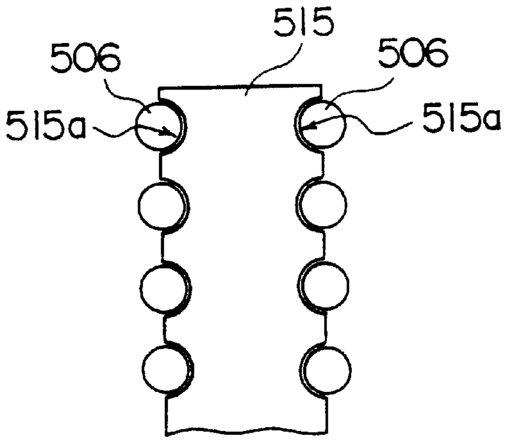
FIG. 4B is a view along the B-direction in FIG. 4A.
Figure 4C:
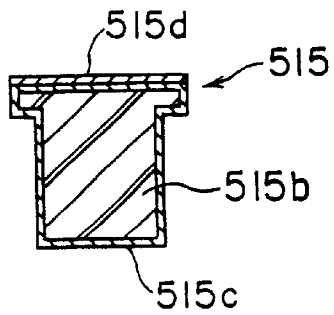
FIG. 4C is a sectional view of another embodiment of a cable block.
Figure 5:
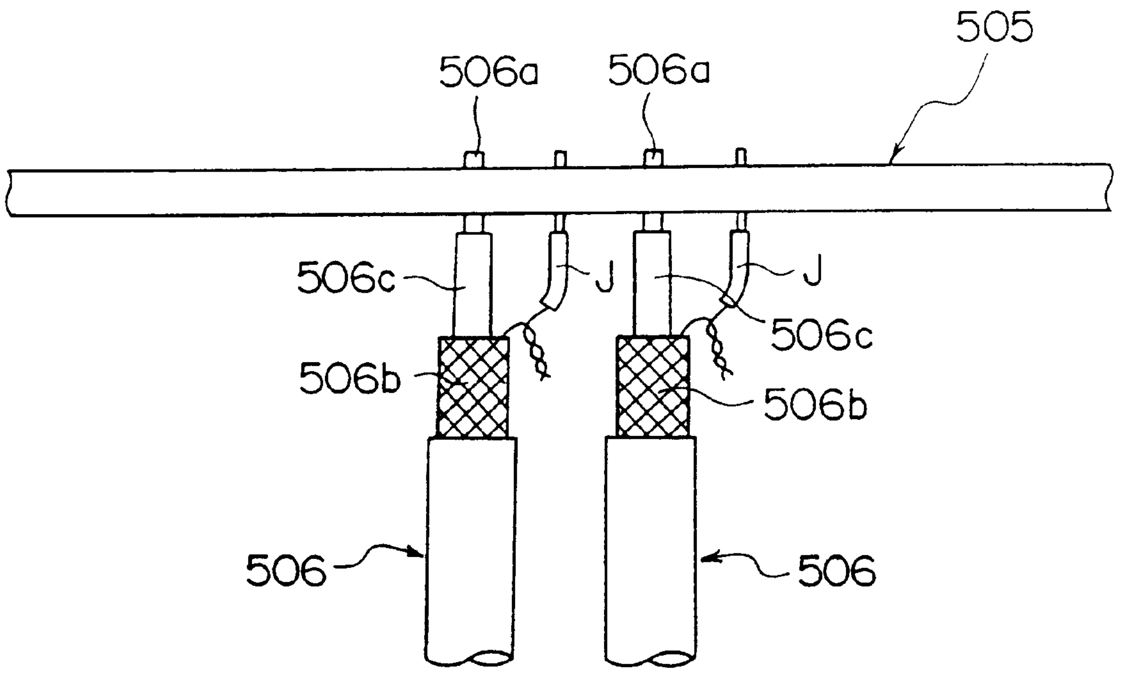
FIG. 5 BACKGROUND ART
FIG. 5 is a view from a side of a connection structure of the related art.

FIGS. 4A to 4C are views of embodiments of a connection structure of a coaxial cable to an electric circuit substrate of the present invention, wherein FIG. 4A is a general sectional view, FIG. 4B is a B perspective view in FIG. 4A, and FIG. 4C is a sectional view of another embodiment of a cable block. FIG. 4A is an enlarged sectional view of a IV portion in FIG. 3.

In the present embodiment, a coaxial cable wherein a core wire 506*a* and a shield 506*b* are provided over an insulation body 506*c* is connected to a socket board 505 as an electric circuit substrate, and a large number of coaxial cables 506 are connected to the socket board 505 of an actual test head 5 as shown in FIG. 2 and FIG. 3, but only two coaxial cables 506 are shown in FIG. 4A to explain a connection structure of the present embodiment.

The socket board 505 is constituted by stacking a large number of wiring pattern layers on which a wiring pattern including a signal line and a ground line is formed, the reference number 505*a* in FIG. 4A indicates a wiring pattern layer including a signal line and 505*c* an insulation layer.

In the present embodiment, there is provided a cable block 515 electrically connected to the ground line 505*b*. The cable block 515 can be comprised of a copper block and can be connected to the ground line 505*b* by peeling a part of the insulation layer 505*c* on its backside surface (the lower surface in the figure) and soldering thereto.

At this time, the overall cable block 515 can be comprised of a copper material, but considering heat conductivity at the time of soldering, it is preferable to be formed by plating with copper on the whole surface of a substrate made by glass, epoxy or polytetrafluoroethylene (PTFE), etc. Furthermore, if one main surface of the ground line side connected to the copper plated cable block or the cable block side of copper plating is formed a soldering plating layer, excellent heat conductivity is obtained and soldering becomes remarkably easier. This example is shown in FIG. 4C. The reference number 515*b* indicates a substrate made by glass, epoxy or PTFE, etc., 515*c* indicates the copper plating layer and 515*d* indicates the soldering plating layer.

The cable block 515 is formed a concave portion 515*a* in accordance with an outward form of the shield 506*b* of the coaxial cable 506 at an interval of the coaxial cable 506 to be mounted. A depth of the concave portion 515*a* is not limited, but it bears a function of determining a position of the core wire 506*a* by being set the shield 506*b* of the coaxial cable 506 in the concave portion 515*a*, thus, it is made to be a suitable depth therefor. In the present embodiment, it is made to be a semicircular shape.

Also, the concave portion 515*a* is connected to the shield 506*b* of the coaxial cable 506 by soldering.

Also, in the present embodiment, the core wire 506*a* is connected by soldering to lands of a signal line formed on the backside surface of the socket board 505 (detailed illustration is omitted). By connecting the core wire 506*a* of the coaxial cable 506 to the lands of the signal line in this way, a connection via-hole (transit through-hole) becomes small and electrostatic capacitance between a signal and a ground can be made smaller. In addition to this, since the shield 506*b* of the coaxial cable 506 is directly connected to the cable block 515, the portion where the insulation body 506*c* is exposed can be made as short as possible and the core wire 506*a* is covered with the shield 506*b* to the end of the coaxial cable 506, as a result, consistency of impedance of a signal becomes preferable.

Furthermore, since the shields 506*b* of a plurality of coaxial cables 506 can be grounded by one cable block 515 in the present embodiment, an area occupied by the ground line 505*b* of the socket board 505 becomes smaller and a higher packaging density of the coaxial cables 506 can be attained. Also, since the shield 506*b* of the coaxial cable 506 is directly connected to the cable block 515, a length of the ground line becomes shorter and electric characteristics becomes preferable.

Note that the embodiments explained above were described to facilitate the understanding of the present invention and not to limit the present invention. Accordingly, elements disclosed in the above embodiments include all design modifications and equivalents belonging to the technical field of the present invention.

What is claimed is:

1. A connection structure of a coaxial cable to an electric circuit substrate, comprising:

a cable block connected to a ground line of the electric circuit substrate; and the coaxial cable wherein a ground line thereof is connected to said cable block, wherein said cable block has a concave portion in accordance with an outward form of said coaxial cable, and the ground line of said coaxial cable is connected to said concave portion.

2. A connection structure of a coaxial cable to an electric circuit substrate as set forth in claim 1, wherein a core wire of said coaxial cable is connected to a land of a signal line of said electric circuit substrate.

3. A connection structure of a coaxial cable to an electric circuit substrate as set forth in claim 2, wherein said cable block is formed on its substrate surface a conductive material layer.

4. A connection structure of a coaxial cable to an electric circuit substrate as set forth in claim 2, wherein the ground line of said electric circuit substrate and said cable block are soldered.

5. A connection structure of a coaxial cable to an electric circuit substrate as set forth in claim 2, wherein said cable block and said ground line of said coaxial cable are soldered.

6. A connection structure of a coaxial cable to an electric circuit substrate as set forth in claim 1, wherein said cable block is provided by partially buried in said electric circuit substrate so as to be connected to the ground line provided to an inner layer of the electric circuit substrate.

7. A connection structure of a coaxial cable to an electric circuit substrate as set forth in claim 1, wherein said cable block is formed on its substrate surface a conductive material layer.

8. A connection structure of a coaxial cable to an electric circuit substrate as set forth in claim 7, wherein said conductive material is copper.

9. A connection structure of a coaxial cable to an electric circuit substrate as set forth in claim 1, wherein the ground line of said electric circuit substrate and said cable block are soldered.

10. A connection structure of a coaxial cable to an electric circuit substrate as set forth in claim 1, wherein said cable block and said ground line of said coaxial cable are soldered.

11. A connection structure of a coaxial cable to an electric circuit substrate, comprising:

a cable block connected to a ground line of the electric circuit substrate; and the coaxial cable, wherein a ground line thereof is connected to said cable block, wherein said cable block is provided by partially buried in said electric circuit substrate so as to be connected to the ground line provided to an inner layer of the electric circuit substrate.

12. A connection structure of a coaxial cable to an electric circuit substrate, comprising:

a cable block connected to a ground line of the electric circuit substrate; and the coaxial cable wherein a ground line thereof is connected to said cable block, wherein a core wire of said coaxial cable is connected to a land of a signal line of said electric circuit substrate and said cable block is provided by partially buried in said electric circuit substrate so as to be connected to the ground line provided to an inner layer of the electric circuit substrate.

* * * * *